Patented Oct. 21, 1941

2,260,262

UNITED STATES PATENT OFFICE 2,260,262

PROCESS FOR PURIFICATION OF HALO-GENATED KETONES

Glen H. Morey, Terre Haute, Ind., assignor to Commercial Solvents Corporation, Terre Haute, Ind., a corporation of Maryland No Drawing. Application May 4, 1940, Serial No. 333,340

10 Claims. (Cl. 260—593)

My invention relates to a process for the separation of halogenated aliphatic ketones from mixtures thereof. More particularly, it relates to a method for separating, in a chemically-pure state, alpha-monohalogenated aliphatic ketones from mixtures containing alpha-monohalogenated and alpha-alpha-dihalogenated aliphatic ketones, and especially such mixtures in which said alpha-monohalogenated and alpha-alpha-dihalogenated aliphatic ketones boil within a temperature range of 10° C. of each other.

A satisfactory and commercially feasible method for the separation of alpha-monohalogenated aliphatic ketones and their corresponding alpha-alpha-dihalogenated derivatives has been a problem of long standing in the art. Because of the similarity in boiling points of such compounds, it has been highly impractical to separate these materials by fractional distillation. In fact, certain of the alpha-halogenated aliphatic ketones apparently cannot be so separated by the most efficient distillation procedures.

Alpha-halogenated ketones are in general used widely in the preparation of valuable organic compounds. However, because of the fact that certain of the alpha-monohalogenated ketones and alpha-alpha-dihalogenated ketones are inseparable, relatively low yields of the desired products are obtained. For example, in the case of the production of chloroacetone there are at least three chlorinated products formed—namely, chloroacetone, symmetrical dichloroacetone, and unsymmetrical dichloroacetone. The symmetrical dichloroacetone present in the reaction product may be separated from the other chloroacetone derivatives by fractional distillation. However, the separation of unsymmetrical dichloroacetone from chloroacetone presents a difficult problem, since the former boils at 118.6° C., while the latter boils at 119.1° C. Because of this fact, these two compounds, when subjected to distillation, behave essentially as a single compound, and unless a chlorine analysis of the reaction product is made, it is highly probable that the presence of appreciable amounts of unsymmetrical dichloroacetone will be overlooked. In the preparation of chloroacetone the content of unsymmetrical dichloroacetone in the reaction product, after fractional distillation, has frequently been reported to be as much as 15 mole per cent. Thus, it may readily be seen that a satisfactory procedure for the separation of chloroacetone from unsymmetrical dichloroacetone, as well as a method for the separation of other similar alpha-halogenated aliphatic ketones, has been greatly needed.

I have now discovered that alpha-monohalogenated aliphatic ketones, and even those which boil less than 10° C. apart from their corresponding alpha-alpha-dihalogenated derivatives, may be effectively separated in a chemically pure state from mixtures containing said alpha-monohalogenated and alpha-alpha-dihalogenated aliphatic ketones by treating said mixtures with a suitable glycol. I have further found that the reaction which occurs, proceeds predominantly with the alpha-monohalogenated aliphatic ketone, until all of the said alpha-monohalogenated aliphatic ketone present in the mixture has combined with the glycol. However, if an excess of the glycol remains, complete reaction between the said glycol and alpha-alpha-dihalogenated aliphatic ketone will also take place.

In general, my invention may be carried out by treating a mixture of alpha-monohalogenated and alpha-alpha-dihalogenated aliphatic ketones with an excess of a suitable glycol in the presence of an acid catalyst, and a water-immiscible organic liquid, such as benzene. The resulting mixture is then heated to a temperature sufficient to cause moderate refluxing. As the water of reaction is formed, it is removed as a constant boiling mixture, and conducted to a suitable separator, from which the water may be withdrawn, and the water-immiscible layer returned to the reaction vessel. Completion of the reaction is evidenced by the failure of additional water to be withdrawn from the reaction mixture. When this stage of the procedure is reached, the water-immiscible liquid is distilled off, and, if desired, air or an inert gas may be forced through the crude reaction products in order to rid said products of any low-boiling materials which may be present therein. The still residue thus obtained consists of the corresponding cyclic ketals of the alpha-monohalogenated and alpha-alpha-dihalogenated aliphatic ketones. The cyclic ketals produced in this manner boil sufficiently far apart to effect a satisfactory separation by distillation, said distillation preferably being carried out under reduced pressure. The corresponding halogenated ketones may then be recovered by distilling separately said cyclic ketals in the presence of acid. Relatively dilute acids, for example, mineral acids of 1% to 20% concentration, may be satisfactorily employed for this purpose. The halogenated ketone thus liberated is distilled off as a constant boiling mixture with water, from which it is recovered in a chemically pure state while the water is continuously returned to the distillation vessel, until said ketone is completely removed. A portion of the glycol, together with the acid used, generally remains in the reaction vessel, and may be utilized in a subsequent run.

A modification of this procedure may be employed in instances where it is desired to remove traces of an alpha-monohalogenated aliphatic ketone from relatively large amounts of the corresponding alpha-alpha-dihalogenated derivative. In such cases the quantity of glycol necessary to combine with the alpha-monohalogenated ketone may be readily determined by a chlorine analysis. A suitable glycol is then added in slight excess of the amount required theoretically to combine with the alpha-monohalogenated ketone present, and the cyclic ketal of said alpha-monohalogenated ketone prepared as described above. When the reaction is complete, the water and benzene are driven off, after which the purified alpha-alpha-dihalogenated ketone, which constitutes the major portion of the mixture, is removed by distillation, leaving as a residue the cyclic ketal of the alpha-monohalogenated ketone, together with a small amount of the cyclic ketal of the alpha-alpha-dihalogenated ketone. The corresponding halogenated ketones may then be readily obtained in a chemically pure state, in accordance with the procedure previously described. The degree of purification of the alpha-alpha-dihalogenated ketone which has been effected may be easily determined by analyzing for halogen the alpha-alpha-dihalogenated ketone thus recovered, and comparing the result with the halogen content of the original ketone mixture.

As examples of alpha-halogenated aliphatic ketones whose corresponding alpha-monohalogenated and alpha-alpha-dihalogenated derivatives boil at approximately the same temperature, and whose mixtures may be conveniently separated by employing my invention, there may be mentioned chloroacetone and unsymmetrical dichloroacetone, $\alpha$-chloroethyl methyl ketone and $\alpha$-$\alpha$-dichloroethyl methyl ketone, chloromethyl ethyl ketone and dichloromethyl ethyl ketone. The boiling points at atmospheric pressure of the above-mentioned ketones are as follows:

| Halogenated ketone | Boiling point |
| --- | --- |
| | °C. |
| Chloroacetone | 119.1 |
| 1-1-dichloroacetone | 118.6 |
| 3-chloro-2-butanone | 114–115 |
| 3-3-dichloro-2-butanone | 113–114 |
| 1-chloro-2-butanone | 137–138 |
| 1-1-dichloro-2-butanone | 138.5–139 |
| 1-3-dichloroacetone | 173–173.4 |
| 1-1-3-trichloroacetone | 172 |

While my invention is particularly adapted to the separation of halogenated ketones from mixtures thereof in which said halogenated ketones boil within a range of 10° C. of each other, it will be obvious to those skilled in the art that my process may also be used for the separation of other halogenated ketones. It will also be apparent that mixtures of halogenated ketones other than the mixtures of alpha-monohalogenated and alpha-alpha-dihalogenated ketones mentioned above, may be separated by my process.

Although I prefer to employ either ethylene or propylene glycols in carrying out my invention, other glycols such as $\alpha$-butylene glycol and $\beta$-butylene glycol may also be employed. Glycols containing from 2 to 4 carbon atoms are especially suitable for use in my process, but any glycol which is capable of combining with halogenated ketones of the type mentioned above, under the reaction conditions employed, to form distillable cyclic ketals, may be utilized; and it is to be understood, in this connection, that the term "glycol," as used herein and in the appended claims, is to be so interpreted. Likewise, although I prefer to use hydrochloric, phosphoric, or sulfuric acids as catalysts in carrying out my invention, any acid, acidic salt, or acidic ester which is sufficiently dissociated to promote ketalization may be used as the catalyst in my process. Furthermore, it is to be noted that this process may be satisfactorily carried out in the absence of an acid catalyst, although the reaction does not proceed with as great rapidity as in the presence of a catalyst.

My invention may be further illustrated by the following specific examples:

*Example I*

To a mixture of chloroacetone and unsymmetrical dichloroacetone (analysis of mixture, 48.86% chlorine) was added sufficient ethylene glycol to combine completely with both chloroacetones. The resulting solution was then refluxed in the presence of a small amount of concentrated hydrochloric acid, and a sufficient quantity of benzene to remove the water formed during the reaction. After the formation of water ceased, the benzene was distilled off, leaving as a residue a mixture of the corresponding cyclic ketals of chloroacetone and unsymmetrical dichloroacetone. This mixture was then subjected to fractional distillation under reduced pressure, and 2-methyl-2-(chloromethyl)dioxolane and 2-methyl-2-(dichloromethyl)dioxolane, boiling at 82° C. (50 mm.) and 108–110° C. (50 mm.) respectively, were collected. The 2-methyl-2-(chloromethyl)dioxolane, obtained in this manner, was then refluxed in the presence of a molecular excess of 1% hydrochloric acid and the chloroacetone liberated therefrom, after which said chloroacetone was removed as a constant boiling mixture with water. The 2-methyl-2-(dichloromethyl)dioxolane was refluxed in the presence of a molecular excess of 20% hydrochloric acid, and unsymmetrical dichloroacetone was similarly recovered. The chloroacetone thus separated, contained 38.29% chlorine, as compared to 38.33% for theory, while the unsymmetrical dichloroacetone obtained in this manner, contained 55.80% chlorine, as compared to 55.88% for theory.

*Example II*

A mixture of 980 parts by weight of unsymmetrical dichloroacetone, having a chlorine content of 54.38%, and 43.4 parts by weight of ethylene glycol was refluxed in the presence of 2 parts by weight of concentrated hydrochloric acid. The water formed during the reaction was removed as a constant boiling mixture with unsymmetrical dichloroacetone, and the dichloroacetone was then recovered by distillation at atmospheric pressure. Upon analysis the unsymmetrical dichloroacetone was found to contain 55.14% chlorine, in contrast to 55.88% for the theoretical amount. The still residue, which contained 2-methyl-2-(chloromethyl)dioxolane, together with a small quantity of 2-methyl-2-(dichloromethyl)dioxolane, was then distilled under vacuum, and the portion boiling at 82° C. (50 mm.), consisting of 2-methyl-2-(chloromethyl)-dioxolane, was collected. This fraction was refluxed in the presence of 30 cc. of 1% hydrochloric acid, and the chloroacetone liberated by this treatment, recovered as a constant boiling mixture with water. After drying, the chloroacetone fraction thus obtained was found to contain 38.30% as compared with 38.33% for theory.

*Example III*

To a mixture of α-chloroethyl methyl ketone and α-α-dichloroethyl methyl ketone (analysis of mixture—43.58% chlorine) was added sufficient propylene glycol to completely combine with both chloro ketones. The resulting solution was then refluxed in the presence of a small amount of concentrated hydrochloric acid, and a sufficient quantity of benzene to remove the water formed during the reaction. After the formation of water ceased, the benzene was distilled off, leaving as a residue a mixture of 2-methyl-2-(1-chloroethyl)dioxolane and 2-methyl-2-(1-1-dichloroethyl)dioxolane. This mixture was then subjected to fractional distillation under reduced pressure and 2-methyl-2-(1-chloroethyl)dioxolane, which distilled over in a clean-cut fraction, was collected, leaving as a still residue 2-methyl-2-(1-1-dichloroethyl)dioxolane. The cyclic ketals thus obtained were then refluxed separately in the presence of a small amount of 1% hydrochloric acid in order to liberate the respective halogenated ketones. The alpha-chloroethyl methyl ketone, obtained in this manner, contained 33.20% chlorine as compared to 33.44% for theory, while the α-α-dichloroethyl methyl ketone thus separated contained 50.25% chlorine as compared to 50.35% for theory.

Although I have only mentioned, by way of example, the applicability of my invention to the separation of mixtures of chloroacetone and unsymmetrical dichloroacetone, and α-chloroethyl methyl ketone and α-α-dichloroethyl methyl ketone, I do not desire to be limited thereto, since it may readily be seen that my invention may also be employed in the separation of other halogenated ketone mixtures. Other obvious modifications which will readily occur to those skilled in the art are likewise to be considered as lying within the scope of my invention.

Having now described my invention, what I claim is:

1. In a process for the separation of halogenated ketones from mixtures thereof, the step which comprises reacting at least one of said halogenated ketones with a glycol, separating the cyclic ketal thus formed, and recovering the corresponding halogenated ketone from said cyclic ketal.

2. In a process for the separation of alpha-halogenated aliphatic ketones from mixtures comprising alpha-monohalogenated and alpha-alpha-dihalogenated aliphatic ketones, the step which comprises reacting said halogenated ketones with a glycol, separating the cyclic ketals thus formed, and recovering the corresponding alpha-halogenated aliphatic ketones from said cyclic ketals.

3. In a process for the separation of alpha-halogenated aliphatic ketones from mixtures comprising alpha-monohalogenated and alpha-alpha-dihalogenated aliphatic ketones which boil within a temperature range of 10° C. of each other, the step which comprises reacting said halogenated ketones with a glycol containing from 2 to 4 carbon atoms, separating the cyclic ketals thus formed, and recovering the corresponding alpha-halogenated aliphatic ketones from said cyclic ketals.

4. In a process for the separation of alpha-halogenated aliphatic ketones from mixtures comprising alpha-monohalogenated and alpha-alpha-dihalogenated aliphatic ketones, the step which comprises reacting said halogenated ketones with a glycol in the presence of an acid catalyst, separating the cyclic ketals thus formed, and recovering the corresponding halogenated ketones from said cyclic ketals.

5. A process for the recovery of alpha-alpha-dihalogenated aliphatic ketones from mixtures thereof with alpha-monohalogenated aliphatic ketones, which comprises reacting said mixture with a glycol in an amount sufficient to completely react with said alpha-monohalogenated ketone and insufficient to react with all of said alpha-alpha-dihalogenated ketone, and separating the unreacted alpha-alpha-dihalogenated ketone from the resulting mixture.

6. In a process for the separation of a mixture containing chloroacetone and unsymmetrical dichloroacetone, the step which comprises reacting said chloroacetones with a glycol containing from 2 to 4 carbon atoms, separating the cyclic ketals thus formed and recovering the corresponding chloroacetones from said cyclic ketals.

7. In a process for the separation of a mixture containing chloroacetone and unsymmetrical dichloroacetone, the step which comprises reacting said chloroacetones with ethylene glycol in the presence of an acid catalyst, separating the cyclic ketals thus formed, and recovering the corresponding chloroacetones from said cyclic ketals.

8. In a process for the recovery of unsymmetrical dichloroacetone from a mixture containing chloroacetone and unsymmetrical dichloroacetone, the steps which comprise reacting said mixture with a glycol containing from 2 to 4 carbon atoms, in an amount sufficient to completely react with said chloroacetone and insufficient to combine with all of said unsymmetrical dichloroacetone, and separating the unreacted unsymmetrical dichloroacetone from the resulting mixture.

9. In a process for the separation of a mixture containing α-chloroethyl methyl ketone and α-α-dichloroethyl methyl ketone, the steps which comprise reacting said chloro ketones with a glycol containing from 2 to 4 carbon atoms, separating the cyclic ketals thus formed, and recovering the corresponding chloroethyl methyl ketones from said cyclic ketals.

10. In a process for the separation of a mixture containing chloromethyl ethyl ketone and dichloromethyl ethyl ketone, the steps which comprise reacting said chloroketones with a glycol containing from 2 to 4 carbon atoms, separating the cyclic ketals thus formed, and recovering the corresponding chloromethyl ethyl ketones from said cyclic ketals.

GLEN H. MOREY.